Feb. 28, 1961   F. D. HYDE   2,972,863
HYDRO-PNEUMATIC WORKING HEAD FOR PLUNGER PUMPS
Filed March 16, 1954   7 Sheets-Sheet 1

INVENTOR.
FLOYD D. HYDE
BY
*Wm. H. Dean*
AGENT

Feb. 28, 1961 F. D. HYDE 2,972,863
HYDRO-PNEUMATIC WORKING HEAD FOR PLUNGER PUMPS
Filed March 16, 1954 7 Sheets-Sheet 7

INVENTOR:
FLOYD D. HYDE,
BY
Wm H. Dean
AGENT.

United States Patent Office 2,972,863
Patented Feb. 28, 1961

2,972,863

HYDRO-PNEUMATIC WORKING HEAD FOR PLUNGER PUMPS

Floyd D. Hyde, San Diego, Calif., assignor to Inventors Development Company, San Diego, Calif., a corporation of California Filed Mar. 16, 1954, Ser. No. 416,633

10 Claims. (Cl. 60—51)

My invention relates to a hydro-pneumatic working head for plunger pumps, this application being a continuation in part of my copending application, Serial No. 94,985, filed May 24, 1949 now abandoned for Hydro-Pneumatic Working Head for Plunger Pumps.

The invention relates to an improvement on hydro-pneumatic working heads for plunger pumps of the type including high and low pressure accumulators having an intercommunicating plunger cylinder and means for transferring fluid from the low pressure accumulator to the high pressure accumulator. Prior working heads for plunger pumps of this general type have been difficult to operate and maintain in pneumatically balanced condition. Pressure regulators have been employed to bleed pressure from the accumulators of such working heads while a constant input of compressed air thereto is used to maintain operating pressure. Such devices having fixed pressure input and relief arrangements do not automatically adapt themselves to a change in load or a change in transfer pump delivery volume.

Other devices of the prior art employ plunger controlling valves operated by means of a separate motor and utilize charged tanks having no means for adding compressible fluid only when needed. Therefore, such prior devices do not meet practical demands for a balanced hydro-pneumatic system. Although several devices of the prior art of this general type are known none of them add compressible fluid to the accumulators in responce to the existence of a predetermined minimum pressure or fluid level in the low pressure accumulator at the outlet of the working plunger cylinder. The prior art devices do not balance the system in accordance with a predetermined minimum pressure in the low pressure accumulator. Therefore, in working heads of this class exhaust of fluid from the working plunger cylinder does not work against a predetermined cushion when the load on the plunger changes. In this manner, the prior systems fail to provide a stable accumulator pressure level to resist the downstroke of the working cylinder plunger. The hydro-pneumatic working heads of the prior art do not provide a balanced system, the speed of which may be automatically varied, and the load of which may be automatically varied, without upsetting the pneumatic balance of the system.

In accordance with the present invention compressible fluid is added to the system when a certain minimum pressure and fluid level exists in the low pressure accumulator into which the plunger cylinder exhausts. This arrangement always insures a pneumatic cushion for the downstroke of the plunger in the working cylinder and thereby permits cycle speed of the plunger to be automatically increased or decreased without unbalancing the system, which is therefore capable of automatically compensating for shock loads due to water hammer in a deep well. The present invention provides for automatic balancing of the system when the speed of the fluid transfer pump between the low and high pressure accumulator is increased or decreased.

A variety of arrangements and equivalent devices are used in accordance with the present invention to provide for automatically adding compressible fluid to the accumulator system when a certain minimum pressure and liquid level exists in the low pressure accumulator. This system with its inherent pneumatic balance is capable of operating at a very rapid cycle rate wherein the working cylinder plunger stroke is of considerable length.

An object of the present invention is to provide a hydro-pneumatic working head for plunger pumps wherein high and low pressure accumulators cooperate with a plunger cylinder and wherein means automatically adds compressible fluid to the accumulator system when a minimum liquid level and a minimum fluid pressure exists in the low pressure accumulator, whereby a certain pressure is maintained in the low pressure accumulator during operation to provide a cushion for fluid exhausted from the working cylinder during down stroke of the working plunger therein.

Another object of the invention is to provide a hydro-pneumatic working head for plunger pumps, wherein high and low pressure accumulators cooperate with a working plunger cylinder whereby the plunger therein is automatically pneumatically balanced during speed and load changes thereon.

Another object of the invention is to provide a hydro-pneumatic working head plunger pump having a long stroke and rapid cycle rate whereby great swept volume of a submerged pump plunger, operated by the working head, is accomplished in proportion to the diameter of the well.

Another object of the invention is to provide a hydro-pneumatic working head for plunger pumps which delivers a great volume of water from a small diameter well casing whereby the initial drilling cost of wells is greatly reduced in proportion to the desired water production.

Another object of the invention is to provide novel means for transferring air from the low pressure accumulator to the high pressure accumulator of the hydro-pneumatic working head.

Another object of the invention is to provide a hydro-pneumatic working head for plunger pumps wherein the fluid transfer pump is a low clearance pump and is adapted to transfer both hydraulic and compressible fluid from the low pressure accumulator to the high pressure accumulator of the hydro-pneumatic working head.

A further object of the invention is to provide a hydro-pneumatic working head for plunger pumps which is so balanced and cushioned that it minimizes accelerative forces and shock loads throughout the entire well pump mechanism greatly reducing wear and thereby minimizing maintenance and operational costs.

A still further object of the invention is to provide a hydro-pneumatic working head for plunger pumps where-in compression of fluid in the low pressure accumulator, resulting from fluid exhausted from the plunger cylinder below the plunger during its downstroke, effectively returns energy to the accumulator system substantially proportional to the energy required to raise the weight of the sucker rod and pump plunger mechanism connected to the working plunger.

Another further object of the invention is to provide a hydro-pneumatic working head for plunger pumps which is adaptable to the vertical elevation of fluids in deep water and oil wells and which is very efficient in such installations.

With these and other objects in view as will appear hereafter, my invention consists of certain novel features of construction, combination and arrangements of parts and portions and certain modifications as will be hereinafter described in detail and particularly set forth in the appended claims, reference being had to the accompanying drawings and to the characters of reference thereon, forming a part of this application in which.

The cylinder, piston 2, crossheads 3 and 4, rods 5 and 6, sucker rod 7, high pressure accumulator 8, low pressure accumulator 9, pump 10, pump motor 11, actuating valve 12, actuating valve piston 13, springs 14 and 15, spring abutments 16 and 17, piston control valve 18, oil surge chamber 19, check valve 20, tubes 21 to 33, inclusive, well casing 34, and the base 35 constitute the principal parts and portions of the form of my working head for plunger pumps as shown in Figs. 1 to 6 of the drawings.

Figures 1, 2:
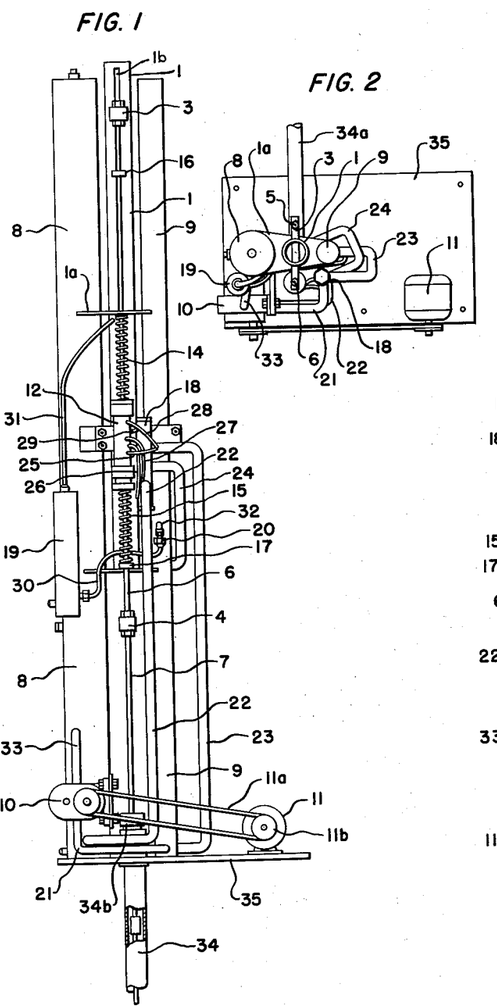
Fig. 1 is a side elevational view of my working head for plunger pumps, shown in connection with a conventional well casing and sucker rod and illustrating portions broken away and in section to amplify the illustration.
Fig. 2 is a top or plan view of my working head for plunger pumps.
Figure 3:
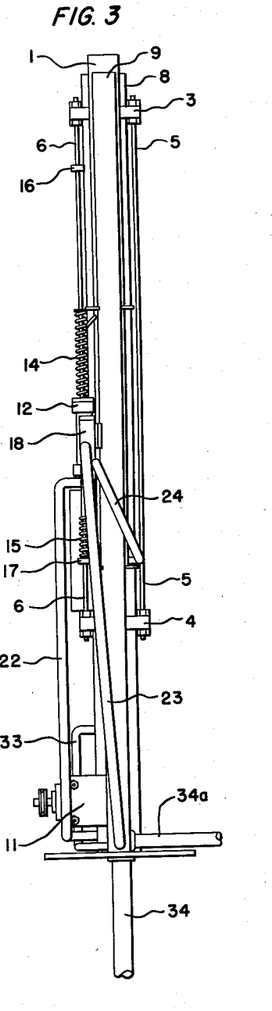
Fig. 3 is a side elevational view similar to Fig. 1, shown taken substantially 90 degrees to that of Fig. 1.

The cylinder 1 is supported on the accumulators 8 and 9 by means of the plate 1a, and the lower ends of the accumulators 8 and 9 are supported on the base 35 of my working head for plunger pumps, as shown best in Fig. 1 of the drawings. Reciprocally mounted in the cylinder 1 is the piston 2. This piston 2 is provided with a piston rod 2a connected to the crosshead 3 which projects through slots 1b and 1c in opposite sides of the cylinder, providing for rectilinear motion of the piston 2 without rotation in the cylinder 1. Connected to the crosshead 3 at opposite ends thereof are the rods 5 and 6, the lower ends of which are connected to a crosshead 4, having the sucker rod 7 suspended from the middle portion thereof, all as shown best in Fig. 4 of the drawings.

Surrounding the rod 6 is the piston 13 of the actuating valve 12, on the opposite ends of which are fixed the collars 13a and 13b, engaged by the springs 14 and 15, which are engageable with the spring abutments 16 and 17, respectively, fixed on the rod 6. It will be noted that the actuator valve piston 13 is provided with two annular grooves 13c and 13d. The tubes 25 to 29, inclusive, communicate with the interior of the actuator valve 12 and the piston 13, as shown best in Fig. 5 of the drawings. The actuator valve 12 is provided with a spring detent 12a, having a ball 12b engageable with annular grooves 13e and 13f in the piston 13 during reciprocal movement of the piston 13 in the valve 12. The annular groove 13c is arranged to alternately communicate the tubes 28 and 29 with each other or the tubes 29 and 27 with each other. It will be noted that the annular groove 13d of the piston 13 is arranged to alternately communicate the tubes 25 and 26 with each other, or the tubes 26 and 27 with each other. The tubes 29 and 26 communicate with the upper and lower ends of the valve 18, which is the piston control valve communicating with the piston 2 for controlling the reciprocal motion thereof in the cylinder 1. This piston control valve 18 is provided with a valve piston 18a therein, having an annular groove 18b which is arranged to alternately provide for intercommunication of the tubes 23 and 24 and the tubes 22 and 24, all as shown best in Fig. 6 of the drawings.

Figure 4:
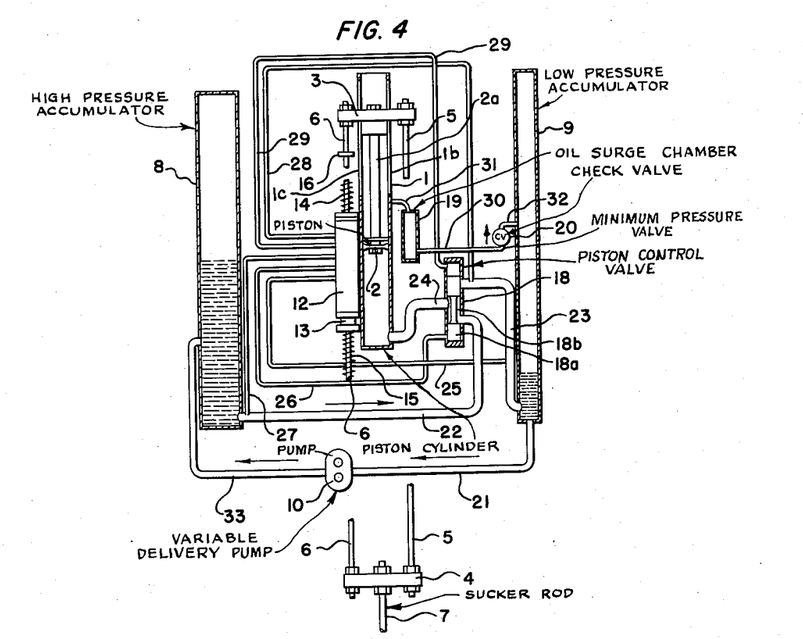
Fig. 4 is a diagrammatic view of the hydraulic and mechanical equipment of my working head for plunger pumps.

The tube 23 intercommunicates with the piston control valve 18 and the lower portion of the low pressure accumulator 9, which is a hollow tubular accumulator of substantially elongated form, as shown best in Fig. 4 of the drawings. The tube 24, communicating with the interior of the piston control valve 18, communicates with the lower inner side of the cylinder 1, below the piston 2, as shown best in Fig. 4 of the drawings. The tube 22 communicating with the interior of the piston control valve 18 communicates with the lower inner side of the high pressure accumulator 8, which is a substantially hollow cylindrical elongated accumulator, adapted to contain hydraulic fluid and air. The tube 21 communicates with the lower inner side of the low pressure accumulator 9 and the inlet side of the pump 10, and the tube 33 communicates with the outlet side of the pump 10 and the inner side of the high pressure accumulator 8, all as shown best in Fig. 4 of the drawings.

The tube 27 communicates with the interior of the tube 22 and carries high pressure from the high pressure accumulator 8 to the central portion of the actuating valve 12. Each of the tubes 25 and 28 communicates with the interior of the low pressure tube 23, which communicates with the interior of the low pressure accumulator 9, all as shown best in Fig. 4 of the drawings.

The well casing 34 is a substantially conventional tubular well casing, having a delivery tube 34a and a packing gland 34b at the upper end of the casing 34, through which the conventional sucker rod 7 is reciprocally mounted. The oil surge return chamber 19 is a hollow cylindrical chamber, having a tube 31 communicating with the interior thereof and this tube 31 communicates with the interior of the cylinder 1 for collecting oil, which passes the piston 2, and is carried on the upper side thereof. Communicating with the lower portion of the chamber 19 is the tube 30, which extends into communicative relationship with the check valve 20, having a tube 32 communicating with the interior thereof, and communicating with the interior of the low pressure accumulator 9 at its opposite end. The check valve 20 is normally closed to prevent fluid under pressure from passing from the low pressure accumulator 9 to the surge chamber 19. It is therefore to be noted that the check valve 20 opens only when the pressure in the low pressure accumulator 9 is below atmospheric pressure, permitting the oil collected in the oil surge chamber 19 to be delivered into the low pressure accumulator 9.

As shown in Fig. 1 of the drawings, the pump 10 is driven by a belt 11a passing over the pulley 11b on the shaft of the motor 11. The pump 10 is a low clearance variable delivery pump capable of delivering either hydraulic or compressible fluid and may be of the gear type or any other suitable type, as desired. If desired, the speed of the pump 10 may be controlled electrically by varying the speed of the motor 11.

The operation of the working head for plunger pumps is substantially as follows;

When the operation of the motor 11 is initiated, the pump 10, operating as the accumulator pump, delivers hydraulic fluid into the high pressure accumulator 8 and exhausts the same from the low pressure accumulator 9. As shown in Fig. 4 of the drawings, the plunger 18a of the piston control valve 18 is in position for causing intercommunication of the tubes 22 and 24 for direct delivery of high pressure fluid into the cylinder 1 for forcing the piston 2 upwardly, which carries the crossheads 3 and 4, together with the rods 5 and 6. As the rod 6 passes upwardly, carrying the spring abutment 17, the spring 15 is compressed to a certain pressure, which causes the piston 13 of the actuator valve 12 to shift upwardly into a position wherein the ball detent 12b engages the annular groove 13f peripherally of the piston 13. In this position, the annular groove 13d provides for intercommunication of the tubes 26 and 27, while the annular groove 13c provides for intercommunication of the tubes 28 and 29 and permits the piston 18a to move upwardly and exhaust fluid into the tube 29, which, communicating with the tube 28, directs the liquid from the upper end of the piston 18a into the low pressure tube 23, communicating with the lower interior of the low pressure accumulator 9.

Figure 5:
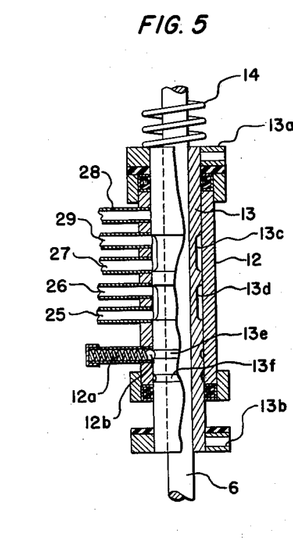
Fig. 5 is an enlarged fragmentary view of the actuating valve of my working head for plunger pumps.
Figure 6:
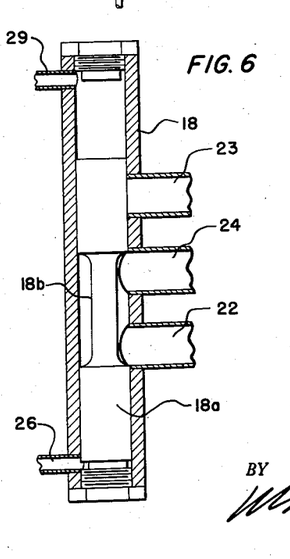
Fig. 6 is a fragmentary, longitudinal, sectional view of the piston operating valve of my working head for plunger pumps.

Concurrent intercommunication of the tubes 26 and 27 causes high pressure fluid from the high pressure accumulator 8 to pass into the tube 26 at the lower end of the piston 18a and force the same upwardly into the upper end of the valve 18, whereupon the annular groove 18b in the piston 18a provides for intercommunication of the tubes 23 and 24. In this position the piston 2, together with the crossheads 3 and 4, rods 5 and 6, and the sucker rod 7, may gravitate, causing compression of the fluid below the piston 2 and exhaustion thereof through the tube 24, valve 18 and tube 23, into the lower interior of the low pressure accumulator 9. As the piston 2 reaches the bottom of its stroke, together with the rods 5 and 6, in connection with the crossheads 3 and 4, the spring stop 16 causes compression of the spring 14 against the collar 13a of the piston 13, which returns it to the position as shown in Fig. 5 of the drawings wherein the annular groove 13c provides for intercommunication of the tubes 27 and 29 and the annular groove 13d provides for intercommunication of the tubes 25 and 26.

In this position, the tube 26 carries fluid exhausted from one end of the piston control valve 18, which is exhausted from the control valve 12 through the tube 25 and into the low pressure tube 23, which communicates with the interior of the low pressure accumulator 9 at its lower portion, as shown best in Fig. 4 of the drawings. Intercommunication of the tubes 27 and 29 causes high pressure fluid entering the valve 12 through the tube 27 to pass outwardly through the tube 29 and into the upper portion of the piston control valve 18, forcing the piston 18a downwardly into the position as shown in Fig. 4 of the drawings. The actuator valve 12, providing for positive operation of the piston control valve 18, prevents lag or stalling of the pump during the downward movement of the piston 2 in the cylinder 1, whereby constant operation of the pump may be reliably maintained at all times.

When it is desired to increase the reciprocal cycle speed of the piston 2, together with the crossheads 3 and 4, rods 5 and 6, and the sucker rod 7, the volume delivery of the pump 10 may be increased by operating the same at higher speed, whereby higher pressure in the high pressure accumulator 8 and correspondingly lower pressure in the low pressure accumulator 9 causes greater upward lifting pressure on the piston 2 and correspondingly reduced compressive resistance below the piston 2 when gravitating, whereby gradual increase in the reciprocating speed of the piston 2 may be accomplished. It will be noted that the down stroke of the piston 2 causes compression of the fluid in the low pressure accumulator 9, above the liquid level therein, whereby the force required to lift the piston 2, together with the crossheads 3 and 4, rods 5 and 6, and the sucker rod 7, minus friction and losses, is automatically stored in the low pressure accumulator 9 with each downstroke movement of the piston 2.

It will be here noted that the volumetric displacement of the cylinder 1 below the piston 2 when in its uppermost position is complementary to the volumetric displacement of the low pressure accumulator 9, so that down stroke of the piston 2 causes sufficient compression in the pressure accumulator 9, to provide a pneumatic cushion for the piston 2 as it reaches the lower end of the cylinder 1 when acted upon by gravitational attraction of the sucker rod 7 in connection therewith. It is therefore to be noted that the volumetric displacement of the pressure accumulator 9 has a direct proportional relationship to the volumetric displacement of the cylinder 1 below the piston 2 when in its uppermost stroke position.

When it is desired to reduce the reciprocating speed of the piston 2, the delivery volume from the pump 10 to the high pressure accumulator 8 is reduced by slowing the operation of the pump 10, which causes reduced pressure in the high pressure accumulator and increased pressure in the low pressure accumulator 9 resisting the down stroke of the piston 2 in the cylinder 1. It will be understood that a certain unit pressure must exist in the high pressure accumulator in order to provide sufficient force on the piston 2 to cause it to attain a certain stroke speed when moving upwardly. When the piston 2 is reciprocating at a certain stroke speed, and the pump 10 is slowed down, the volume delivery of fluid to the high pressure chamber decreases. A few strokes of the piston 2 delivers fluid to the low pressure chamber 9 at a greater rate than the pump 10 supplies fluid to the high pressure chamber. This is caused by existing pneumatic pressure above the oil in the high pressure accumulator at the time when the speed of the pump 10 is reduced. Thus, momentarily the fluid is transferred to the low pressure accumulator at a greater rate than it is removed by the pump 10 which increases pressure in the low pressure chamber 9. At the same time the pump 10 delivers hydraulic fluid to the high pressure chamber 8 at a lower rate than the fluid is forced therefrom by the pneumatic pressure therein which gradually lowers the pressure in the high pressure chamber 8. Due to this reduced pressure in the high pressure chamber 8, the upstroke speed of the piston 2 is decreased and due to the corresponding pressure rise in the low pressure chamber 9, the downstroke speed of the piston 2 is decreased. It will be understood that increased pressure in the low pressure chamber 9 will cause compressive resistance to fluid exhausted thereinto from the plunger cylinder when the piston is moving downwardly. Thus, the speed of reciprocal operation of the piston 2 is positively controlled by the delivery speed and volume of the pump 10. Due to the pressure of compressible fluids in the upper portions of the high and low pressure accumulators 8 and 9, the reciprocal operation of the piston 2 is at all times cushioned and therefore may be reciprocated very rapidly without causing high acceleration stresses in the various mechanical elements and structural portions of the pump to which my working head for plunger pumps is connected. Such reduction of accelerative forces throughout the mechanism promotes long life to a pump and insures the same against breakage in the event the pump plunger at the lower end of the sucker rod 7 becomes clogged.

It will be here noted that after the pump has been at rest for a considerable length of time, the compressed air in the high and low pressure accumulators 8 and 9 may gradually escape, and when the pump is again started all of the liquid or hydraulic fluid is first removed from the low pressure accumulator 9 by means of the pump 10. In this manner pressure at the inlet of the pump 10 is reduced to a region below atmospheric pressure. Then the air is admitted and drawn through the low pressure accumulator 9, via tube 32, check valve 20, tube 30, surge chamber 19, tube 31, and the slots 1b and 1c in the sides of the cylinder 1, so that the intake or inlet of the pump 10 communicates with atmosphere and draws in a supply of air, which is compressed into the high pressure accumulator 8 until sufficient pressure has been built up in the system to initiate the operation of the well pump, not shown, and to gain certain cycling speed of the reciprocal plunger 2, in accordance with the delivery speed of the pump 10. It will be noted that an increase in the speed of the pump 10 dictated by adjustments intended to increase reciprocal speed of the plunger 2 causes similar inclusion of air from atmosphere into the low pressure accumulator 9, and from the low pressure accumulator 9 through the pump 10 and into the high pressure accumulator 8. It will be here noted that the check valve 20 may be connected directly with the inlet of the pump 10 so that air may be automatically admitted thereto when pressure therein drops below atmospheric pressure. When liquid is pumped from the low pressure accumulator 8 and the inlet of the pump 10 is below atmospheric pressure a minimum liquid content and fluid pressure exists in the low pressure accumulator and the pump 10.

In the modified form of the present invention as shown in Figs. 7 to 11, inclusive, means is provided to render a hydropneumatic working head particularly useful in deep wells which may be extended to depths of 5,000 feet or more. In this modified structure means is provided for maintaining the minimum pressure in the low pressure accumulator above atmospheric pressure in order to provide a high pressure cushion for resisting the downstroke of the working piston when it is supporting a long heavy sucker rod. In addition, the present modified working head for plunger pumps includes an unloading valve which is adapted to relieve compressed air from the high pressure accumulator when a load in connection with the sucker rod and working piston of the working head is suddenly reduced. A low pressure accumulator 40 is partially filled with hydraulic fluid and arranged to maintain compressed air thereabove for pressurizing the same. A high pressure accumulator 45 is partially filled with hydraulic fluid and is arranged to retain compressed air thereabove for pressurizing the same and forcing the hydraulic fluid through the tube 62, unloading valve 55 and into a tube 69 which conducts the high pressure fluid to an alternating valve 50 which, when in certain position, permits high pressure fluid to force a piston 47 upwardly in the cylinder 51 for raising the sucker rod 47a. The alternating valve 50 is also arranged to permit fluid to flow from the lower side of the piston 47 into the tube 68 which conducts it to the interior of the low pressure accumulator 40, as will be hereinafter described in detail. From the low pressure accumulator 40 oil passes through a tube 66 to the minimum pressure valve 43 which at its outlet communicates through a tube 56 with a transfer pump 42 which delivers air and hydraulic fluid through a tube 61 into the interior of the high pressure accumulator 45. A surge chamber 51a surrounds the upper end of the cylinder 51 and is drained by a tube 65 which communicates with a sump 41. Communicating with the lower portion of the sump 41 is a tube 58 which conducts hydraulic fluid and air to a check valve 44 which communicates through a tube 57 with a tube 56. Communicating with the upper portion of the high pressure accumulator 45 is a tube 64 which is adapted to conduct compressed air to a bleed valve 46 which communicates with the interior of the low pressure accumulator 40. A gauge 48 communicating with the tube 67 is adapted to indicate pressure in the low pressure accumulator 40.

Figure 8:
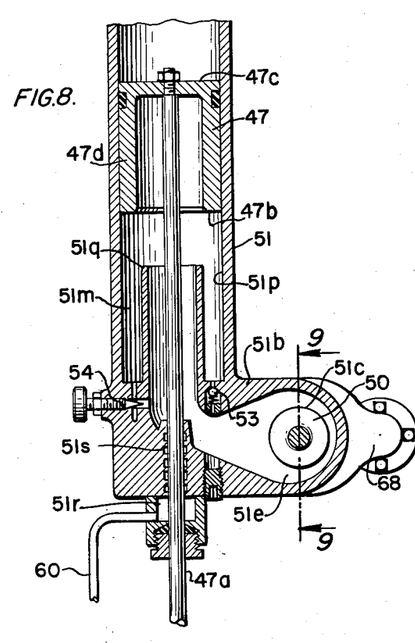
Fig. 8 is an enlarged, vertical, sectional view of a working piston and alternating valve of the modified structure shown in Fig. 7 of the drawings.
Figure 9:
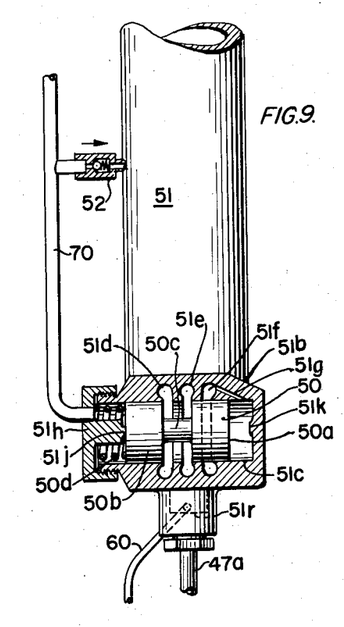
Fig. 9 is a sectional view taken from the line 9—9 on Fig. 8.

Referring to Figs. 8 and 9 of the drawings it will be seen that the cylinder 51 is provided at its lower end with a casing 51b forming a valve chamber having a bore 51c in which the alternating valve 50 is reciprocally mounted. This alternating valve 50 is a spool type valve having end portions 50a and 50b intimately fitted in the bore 51c. These portions 50a and 50b are interconnected with an integral reduced diameter stem 50c spacing the portions 50a and 50b apart equal to the span of two of three ports 51d, 51e, 51f in the casing 51b. The port 51d communicates with the tube 69 and the high pressure accumulator 45 while the port 51e communicates with the interior of the cylinder 51. The port 51f communicates with tube 68 and the low pressure accumulator 40. It will be seen that the alternating valve 50 may be moved to a position wherein the space between the valve portions 50a and 50b spans the ports 51e and 51f permitting the interior of the cylinder 51 to communicate with the tube 68 and low pressure accumulator 40. The casing 51b is provided with an internal passage 51g which communicates with the port 51f and the end 50a of the alternating valve 50. This passage is arranged to transfer hydraulic fluid under pressure from the port 51f to the portion 50a of the alternating valve 50 as will be hereinafter described in detail. Engaging the portion 50b of the alternating valve 50 is a spring 50d which is retained by a casing cap 51h screw-threadably connected to the casing 51 as shown best in Fig. 9 of the drawings. This cap 51h is provided with an internal stop portion 51j adapted to limit reciprocation of the alternating valve 50 so that it properly coincides with the ports 51d and 51e. Likewise, a stop 51k is provided internally of the casing 51b for the purpose of stopping the alternating valve 50 so that it coincides with the ports 51e and 51f. Communicating with the interior of the casing cap 51h is a tube 70. This tube 70 communicates with check valves 49 and 52 which communicate with the interior of the cylinder 51. The check valve 49 is so located that it is near the upper end of the cylinder 51 and is adapted to permit flow of high pressure hydraulic fluid into the tube 70, when the piston 47 reaches a position wherein its lower end 47b is slightly above said check valve 49. The check valve 52 is arranged to permit flow from the tube 70 into the cylinder 51 when the top 47c of the piston 47 is below said check valve 52. The piston 47 is an inverted cup shaped piston having an annular skirt 47d which is adapted to fit in a conforming annulus 51m in the lower end of the cylinder 51. The annulus 51m is formed intermediate the bore 51p and an upwardly extending hollow cylindrical tube 51q. Communicating with the annulus 51m and the port 51e is a check valve 53 which is arranged to permit flow from the annulus 51m into the port 51e. This provides a vent for annulus 51m when the skirt 47d of the piston 47 enters the same whereby hydraulic fluid below the piston 47 in the annulus 51m may vent to the port 51e during down-stroke of the skirt 47d in the annulus 51m. An adjustable snubber valve 54 is screw-threaded in the casing 51b and provides an intercommunicating passage between the annulus 51m and the port 51e to permit gradual passage of high pressure fluid from the port 51e to the annulus 51m during upstroke of the piston 47 in order to prevent the effects of high accelerative forces on the submerged pump mechanism or to provide time lag in connection with the piston 47, so that the sucker rod 47a and associated parts may become fully stressed before the entire cross sectional area of the piston 47 is subjected to the force of high pressure fluid entering through the port 51e.

Figure 10:
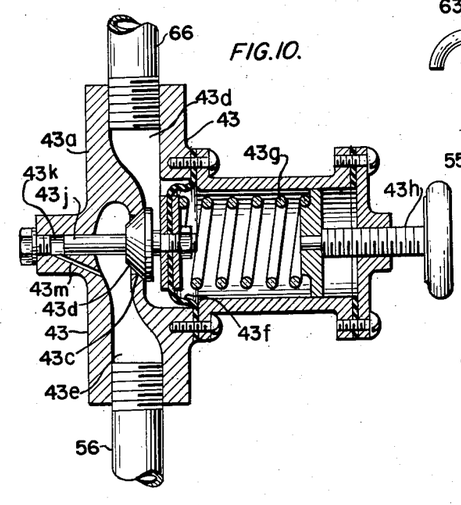
Fig. 10 is an enlarged sectional view of the minimum pressure valve of the working head for plunger pumps shown in Fig. 7.

The minimum pressure valve 43 is arranged in communicative relationship with the low pressure accumulator 40 by means of a tube 66 and also communicates with the transfer pump 42 by means of the tube 56. This minimum pressure valve 43 is shown in Fig. 10 of the drawings wherein the tube 66 is shown screw-threadably connected with the casing portion 43a of the minimum pressure valve 43 to provide an inlet therein for fluid passing from the low pressure accumulator 40. The tube 56 is arranged in screw-threaded relationship with the casing 43a of the minimum pressure valve 43 and both the tubes 56 and 66 communicate with a poppet valve 43b which engages a seat 43c intercommunicating with passages 43d and 43e connected with the tubes 56 and 66, respectively. A diaphragm 43f is exposed to pressure in the low pressure accumulator 40 through the tube 66 and passage 43d. This diaphragm is loaded by means of a compression spring 43g which is adjustably supported by the manually operated screw 43h. The spring 43g tends to force the diaphragm 43f and the poppet valve 43b toward the seat 43c for closing the valve and preventing flow of fluid from the passage 43d to the passage 43e. The poppet valve 43b is provided with a pilot stem 43j which is guided in a bore portion 43k in the casing 43a. A vent passage 43m permits fluid to be exhausted from the bore 43k into the passage 43e. This prevents a dashpot effect at the end of the pilot shaft portion 43j of the poppet valve 43b. The diaphragm 43f being subjected to pressure in the low pressure accumulator 40, tends to open the valve 43b in accordance with a predetermined pressure as fixed by adjustment of the manually adjustable screw 43h which compresses the spring 43g in the direction of the valve seat 43c. Thus, minimum pressure of the low pressure accumulator 40 may be set as desired.

Figure 11:
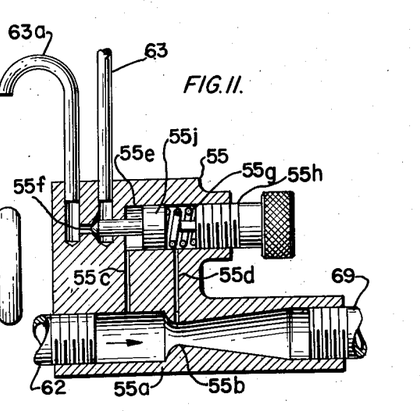
Fig. 11 is a sectional view of the unloading valve of the working head for plunger pumps shown in Fig. 7.

The unloading valve 55 intercommunicating with the tubes 62 and 69 at the outlet of the high pressure accumulator 45 is arranged to relieve pneumatic pressure from the upper portion of the high pressure accumulator 45 when a load on the sucker rod 47 is accidentally relieved due to breakage thereof or due to expanding gases in a well or any other effect which might actually reduce the vertical load on the sucker rod 47a. This unloading valve 55 as shown in Fig. 11 of the drawings is provided with a casing 55a having internally screw-threaded portions into which the tubes 62 and 69 are secured. In the casing 55a a venturi portion 55b is provided. An orifice 55c communicates with a passage 55b upstream of the restricted portion of the venturi 55b while a second passage 55d communicates with the restricted portion of the venturi passage 55b. The passages 55c and 55d are positioned on opposite sides of a piston 55j which is reciprocally mounted in a bore 55e in the casing 55. Secured to the piston 55j is a valve member 55f which intercommunicates with the tube 63 and a tube 63a and which is adapted to vent the tube 63a to atmosphere. A spring 55g engages the piston 55j and is manually adjustable by means of the hand screw 55h. Thus, predetermined flow conditions within the venturi passage 55b will cause a certain pressure differential on opposite sides of the piston 55j causing it to move against compression of the spring 55g and open the valve 55f from its seat so that high pressure air from the upper portion of the high pressure accumulator 45 will pass downwardly through the tube 63 and outwardly through the tube 63a to atmosphere. Such flow conditions through the venturi passage 55b could only occur in the event the piston 47 became unloaded and started to move upwardly in the cylinder 51 at a rapid rate.

The operation of the modified form of my working head for plunger pumps in accordance with the present invention is substantially as follows:

The low pressure accumulator 40 is filled with oil to the discharge level of the tube 66 and the sump 41 is filled through the filler neck 41a with sufficient oil to charge the remainder of the system including the high pressure accumulator 45 and connected tubing and portions of the cylinder 51. The pump 42 which is a low clearance pump is then put into operation by a suitable prime mover. The pump 42 is capable of pumping hydraulic and compressible fluid from the tube 56 and through the tube 61 into the high pressure accumulator 45. Initially, there is no pressure in the low pressure accumulator 40 so the minimum pressure valve 43 is in a closed position wherein the poppet valve 43b firmly engages the seat 43c. The pump 42 then must draw oil from the sump 41 via the tube 58, check valve 44, tube 57, and tube 56. Such oil is pumped into the high pressure accumulator 45 and after all the oil is transferred from the sump 41 to the high pressure accumulator 45, continued operation of the pump 42 compresses air in the high pressure accumulator. The air which is compressed into the high pressure accumulator 45 initially travels into the filler neck 41a of the sump 41, through the check valve 44 and into the tube 56. At this time the bleed valve 46 (Fig. 7) is manually opened. This valve 46 is a shut off valve positioned in the tube 64 and provides for intermittent communication of the high pressure accumulator with the low pressure accumulator as desired. This bleed valve 46 is manually operated and when the hydro-pneumatic working head is once started this valve 46 is closed and inoperative. While the bleed valve 46 is open compressed air from the upper portion of the high pressure accumulator 45 passes into the low pressure accumulator 40. When the bleed valve 46 is opened the minimum pressure valve 43 is fully loaded by operation of the manual screw 43h causing extreme compression of the spring 43g for holding the valve 43b against its seat 43c. The pump 42 continues to compress air in both the high and low accumulators until the piston 47 starts to rise in the cylinder 51. At this time the pressure gauge 48 is read and the bleed valve 46 is closed to prevent any additional compressed air to enter the low pressure accumulator 40. The minimum pressure valve is then adjusted by relieving pressure of the spring 43g until a slight drop is indicated by the pressure gauge 48. The pump 42 continues to compress air into the high pressure accumulator until the piston 47 reaches the top of its stroke wherein the skirt edge 47b is in the dash line position above the check valve 49. At this position the inlet to the check valve 49 is uncovered permitting high pressure oil in the cylinder 51 to pass into the tube 70 and downwardly through the cap 51h and into the bore 51c tending to assist the spring 50d to force the valve member 50 toward the stop 51k. When the valve member reaches the stop 51k, the ports 51e and 51f are then in communicative relationship permitting oil or hydraulic fluid to flow from the cylinder 51 into the tube 68 and low pressure accumulator 40. The weight of the sucker rod 47a acting on the piston 47 causes it to move downwardly forcing oil out of the cylinder 51 and into the low pressure accumulator 40. Thus, pressure in the low pressure accumulator is raised, which raised pressure acts on the diaphragm 43f of the minimum pressure valve causing it to force the poppet valve 43b from the seat 43c whereupon hydraulic fluid passes into the tube 56 and to the inlet of the pump 42. Thus, the pump 42 transfers hydraulic fluid from the low pressure accumulator 40 to the high pressure accumulator 45. The piston 47 continues its down stroke in the cylinder 41 until the upper end 47c thereof passes the outlet of the check valve 52 which is then exposed to atmospheric pressure. The pressure existing in the tube 68 is applied to the end of the valve member 50 through the passage 51g. This pressure is sufficient under the conditions being discussed to overcome compression of the spring 50d and thus forces the valve member 50 against the spring and into engagement with the stop 51j. While the valve member 50 moves toward the stop 51j, hydraulic fluid flows outwardly through the tube 70 and through the check valve 52 into the cylinder 51 above the piston 47. It will be understood that during the down stroke of the piston 47 the skirt 47d passes into the annulus 51m, in the lower end of the cylinder 51, and that further downward movement is limited to gradual settling operation by means of the check valves 53 and 54 which permit the fluid slowly to pass from the annulus 51m into the port 51e. When the valve 50 engages the stop 51j the ports 51d and 51e are interconnected permitting high pressure fluid to pass from the high pressure accumulator 45 into the lower end of the cylinder 51. As high pressure fluid from the high pressure accumulator 45 enters the lower end of the cylinder 51 through the port 51e the annulus 51m receives fluid very slowly through the snubber valve 54 and thus the entire cross sectional area of the piston 47 is not subjected to rapid loading or high forces until all the elements in connection with the sucker rod 47a have been fully stressed whereby the effects of accelerative stresses in such equipment is obviated. During reciprocal movement of the sucker rod 47a the labyrinth seal 51s in the lower end of the cylinder 51 prevents excessive leakage of hydraulic fluid around the sucker rod 47a. Slight leakage which passes the labyrinth seal 51s is trapped in a small sump 51r from which it gravitates to the sump 41 through the tube 60.

Attention is called to the operation of the minimum pressure valve 43 during stroking operation of the piston 47. When the piston 47 starts to rise the pump 42 continues to transfer hydraulic fluid from the low pressure accumulator 40 to the high pressure accumulator 45 until the pressure in the low pressure accumulator 40 drops below a set minimum pressure which is predetermined by adjustment of the spring 43g. When a minimum pressure exists in the low pressure accumulator 40 the minimum pressure valve 43 closes and causes pressure at the inlet of the pump 42 to drop below atmospheric pressure, whereupon, air is drawn through the inlet 41a of the sump 41, through the check valve 44 and into the inlet of the pump 42 through the tubes 56 and 57. The air from atmosphere is then forced into the high pressure accumulator 45. This addition of air to the hydraulic fluid continues until the stroke volume rate of the piston 47 matches the fluid pumping rate of the pump 42. At this time the minimum pressure valve stops closing at each stroke cycle of the piston 47 and tends to provide continuous flow through tubes 56 and 66.

It will be herein noted that the descent rate of the piston 47 is controlled by the loading of the spring 43g of the minimum pressure valve 43. An increase in the spring loading decreases the rate of descent of the piston 47 and conversely lowering the spring loading of the diaphragm 43f increases the descent rate of the piston 47.

After initial charging of the low pressure accumulator 40 air is maintained in the low pressure accumulator by tendency of the air to be absorbed in the oil in the high pressure accumulator and released in the low pressure accumulator. The surplus air carried to the low pressure accumulator 40 by absorption in the high pressure accumulator is returned to the high pressure accumulator by the pump 42.

The hydraulic fluid, discharged into the cylinder 51 through the check valve 52 above the working piston 47 when it is in its lowermost stroke position, is carried upwardly in the cylinder 51 during upstroke of the piston 47 and deposited into the surge chamber 51a. It will be noted that this hydraulic fluid is discharged into the cylinder 51 when the valve member 50 moves to its position against the stop 51j. Thus, fluid passes through the tube 70 and check valve 52 and into the cylinder 51. It will be further noted that oil which leaks past the piston 47 is also deposited in the surge chamber 51a from which it gravitates through the tube 65 into the sump 41 into position to be picked up through the check valve 44 and transferred by the pump 42 into the high pressure accumulator 45.

It will be understood that compressible fluid is added to the hydraulic fluid in the system of the present hydro-pneumatic working head when pressure at the inlet of the pump 42 drops below atmospheric pressure. When the pressure at the inlet of the pump 42 drops below atmospheric pressure air flows into the sump 41 through either the tube 65 or filler neck 41a and upwardly through the check valve 44 into the tube 56. Thus, when pressure drops below atmospheric pressure at the inlet of the transfer pump, the check valve 44 permits atmosphere to enter the pump 42 and to be compressed and added to the hydraulic fluid in the high pressure accumulator 45. As hereinbefore described, the minimum pressure valve 43 may be set to maintain the pressure in the low pressure accumulator 40 at a region considerably above atmospheric pressure. Thus, when the minimum pressure valve 43 closes and the pump 42 continues to operate it exhausts all fluid from the tube 56 and thus drops pressure therein below atmospheric. The tube 56 being in communication with the inlet of the pump 42 then supplies atmosphere as hereinbefore described.

Figures 12, 13:
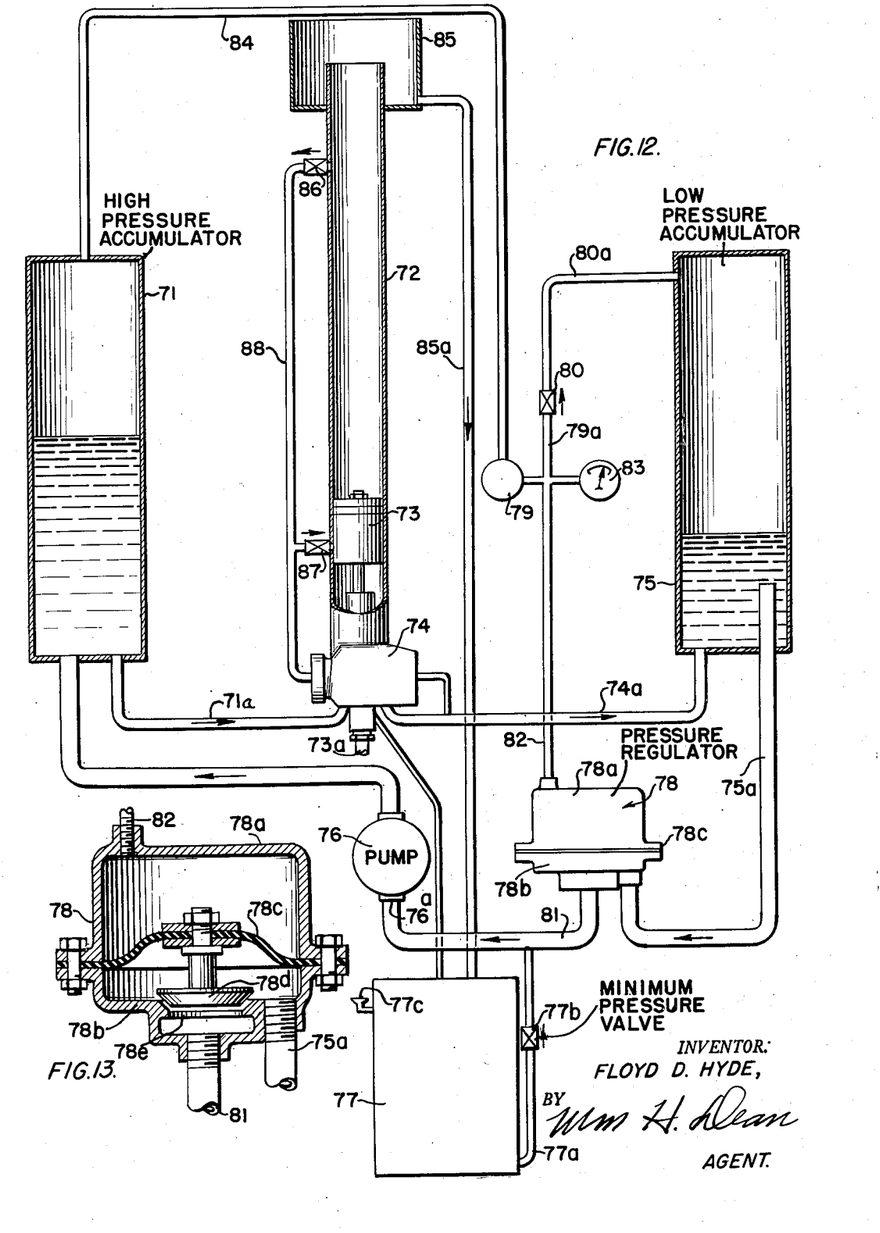
Fig. 12 is a diagrammatic view of a further modified form of the working head for plunger pumps in accordance with the present invention.
Fig. 13 is an enlarged sectional view of the minimum pressure valve of the working head for plunger pumps shown diagrammatically in Fig. 12.

In the modification, as shown in Figs. 12 and 13, a high pressure accumulator 71 communicates with an alternating valve 74 by means of a tube 71a. The alternating valve 74 is similar to the hereinbefore described alternating valve 50 shown in Fig. 7 of the drawings. This alternating valve 74 communicates with the cylinder 72 in which the piston 73 is reciprocally mounted in supporting relationship with the sucker rod 73a. The outlet of the alternating valve 74, by means of a tube 74a, communicates with the interior of the low pressure accumulator 75 which contains hydraulic fluid and compressed air in a similar manner to that within the hereinbefore described low pressure accumulator 40. A tube 75a communicates with the interior of the low pressure accumulator 75 and with the minimum pressure valve 78. The minimum pressure valve 78 is provided with a paired casing portion 78a and 78b. The tube 75a as shown in Fig. 13 communicates with the interior of the casing 78b at one side of a diaphragm 78c which is clamped between the casings 78a and 78b. The diaphragm 78c is a flexible diaphragm arranged to support a poppet valve 78d which is provided with a seat 78e in the casing 78b. Communicating with the poppet valve 78d and its seat 78e is a tube 81 which conducts fluid to the inlet of the transfer pump 76. This transfer pump 76 is a low clearance pump adapted to pump both hydraulic and compressible fluids. Communicating with the interior of the casing 78a and diaphragm 78c is a tube 82. This tube 82 communicates with a pressure gauge 83 and pressure regulator 79. The pressure regulator 79 communicates with a tube 84 which is connected with the upper portion of the high pressure accumulator 71. The tube 84 is adapted to conduct compressed air from the high pressure accumulator 71 to the pressure regulator 79 which reduces the pressure to a predetermined minimum pressure desired in the low pressure accumulator 75. A tube 79a communicates with the pressure regulator 79 and a check valve 80 which exhausts into a tube 80a communicating with the upper interior of the low pressure accumulator 75. A surge chamber 85 communicates with the upper end of the cylinder 72 and this surge chamber 85 is provided with a drain tube 85a which communicates with the sump 77. Communicating with the lower portion of the sump 77 is a tube 77a having a check valve 77b therein. The tube 77 communicates with the interior of the tube 81 and the inlet of the pump 76. Check valves 86 and 87 correspond with check valves 49 and 52 of the hereinbefore described modification disclosed in Fig. 7 of the drawings. The check valves 86 and 87 communicate with a tube 88 which corresponds with the hereinbefore described tube 70 shown in Fig. 7 of the drawings.

The operation of the modified working head for plunger pumps as shown in Fig. 12 and 13 is substantially as follows; the sump 77 by means of its filler neck 77c is charged with hydraulic fluid and the low pressure accumulator 75 is charged with a certain amount of hydraulic fluid. The pump 76 when started and operated draws hydraulic fluid from the sump 77 through the check valve 77b and delivers the hydraulic fluid to the interior of the high pressure accumulator 71. When all the hydraulic fluid is exhausted from the sump 77 air is drawn through the filler neck 77c or tube 85a into the sump 77. The air is then drawn through the check valve 77b and into the inlet of the pump 76. The pump 76 then compresses the air into the high pressure accumulator 71 until sufficient pressure has been built up to cause the piston 73 to rise in the cylinder 72. When such pressure exists in the high pressure accumulator 71 the pressure regulator 79 has already conducted reduced pressure to the interior of the low pressure accumulator 75 through the check valve 80 and tube 80a. It will be understood that the adjustment of the pressure regulator 79 is predetermined in order that a predetermined minimum pressure may be charged into the low pressure accumulator 75. A tube 82 communicating with the outlet of the pressure regulator 79 also transmits an equal pressure to the interior of the casing 78a and to the diaphragm 78c. Thus, pressure in the casing 78a and the interior of the low pressure accumulator 75 is initially equal. As the piston 73 continues to rise in the cylinder 72 the alternating valve operates in a similar manner to the alternating valve 50 hereinbefore described. As the piston 73 descends it exhausts fluid through the alternating valve 74 and tube 74a into the low pressure accumulator 75. When pressure therein rises above the minimum pressure set by the pressure regulator 79 it acts through the tube 75a on the diaphragm 78c within the casing 78b. During downstroke of the piston 73, pressure in the casing 78b rises and forces the diaphragm 78c to open the poppet valve 78 permitting fluid to pass outwardly through the tube 81 and to the inlet of the transfer pump 76. Referring to Fig. 13 of the drawings it will be seen that the area of the popet valve 78d is subjected to pressure within the casing 78b and therefore a considerable pressure differential across the diaphragm 78c must occur before the poppet valve 78d is opened. For example, a pressure differential of ten pounds per square inch may be necessary to cause the poppet valve 78d to open; accordingly pressure in the casing 78b must rise to a region wherein it may be, for example, ten pounds greater than the pressure in the casing 78a. In the event pressure in the low pressure accumulator 75 does not rise to a region wherein it is ten pounds per square inch greater than the pressure in the casing 78a the poppet valve 78d will remain closed and the transfer pump will create a partial vacuum at its inlet 76a causing air to be drawn through the sump 77 and check valve 77b. Such air will be compressed in the high pressure accumulator 71 and, after the piston 73 has again stroked, pressure in the low pressure accumulator 75 will tend to rise until a sufficient pressure differential exists across the diaphragm 78c to cause opening of the poppet valve 78d. It will be noted that the check valve 80 prevents pressure above the initial charge pressure from being exerted in the casing 78a. It will be understood that such pressure differential will be substantially constant when the stroke cycle rate of the piston 73 has matched the fluid delivery rate of the pump 76. It will be understood that compressible fluid is automatically added to the hydraulic fluid in the working head system whenever pressure at the inlet of the transfer pump 76 drops below atmospheric. This air or compressible fluid is automatically added to the system whenever pressure in the low pressure accumulator 75 reaches a predetermined minimum. As hereinbefore described the pressure regulator 79 regulates the initial charge pressure within the low pressure accumulator 75 and a slight increase in pressure occasioned by transfer of fluid through the tube 74a is necessary to create a sufficient pressure differential across the diaphragm 78c to open the poppet valve 78d. In this manner the pressure regulator 79 permits operation of the minimum pressure valve 78 with a certain relationship to pressure in the low pressure accumulator 75 whereby the pressure therein may be maintained considerably above atmospheric and the check valve 77b will permit the pump 76 to add additional air to the hydraulic fluid in the system while at the same time the inlet of the pump drops below atmospheric pressure.

Figure 7:
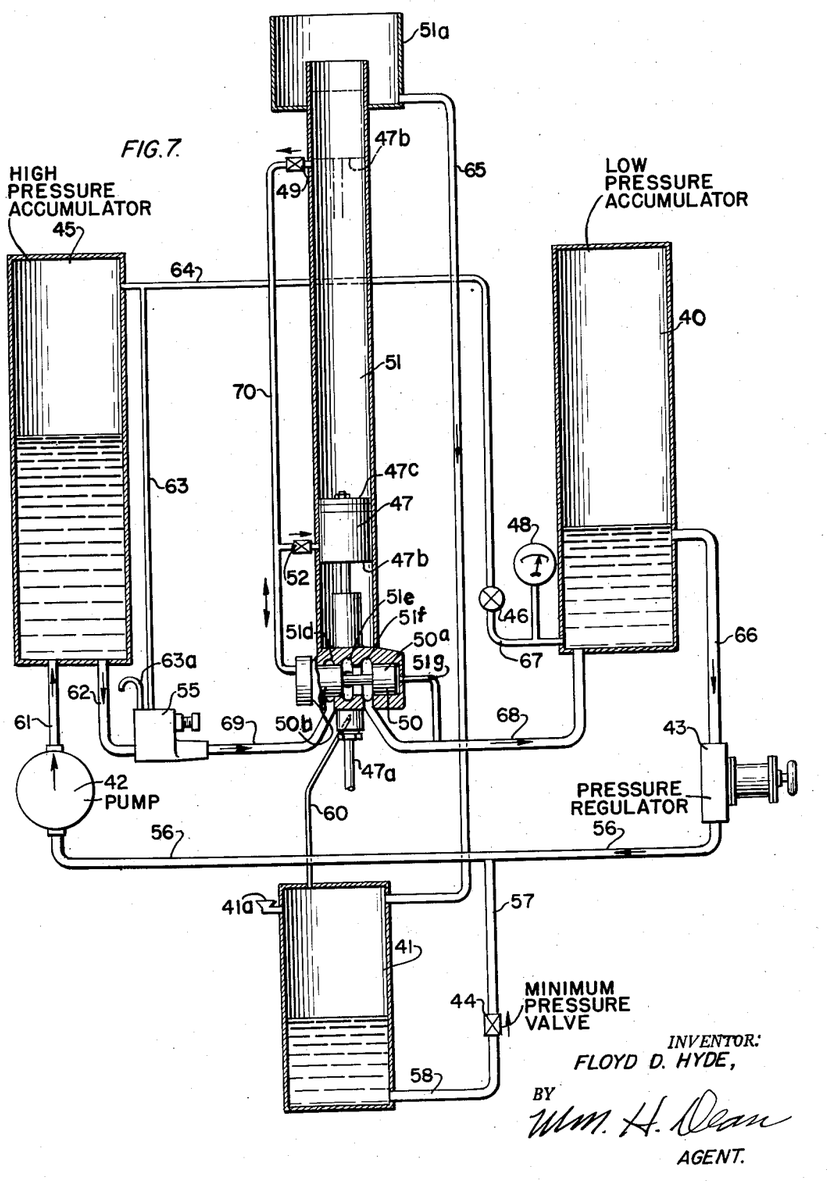
Fig. 7 is a diagrammatic view of a modified form of my working head for plunger pumps.
Figure 14:
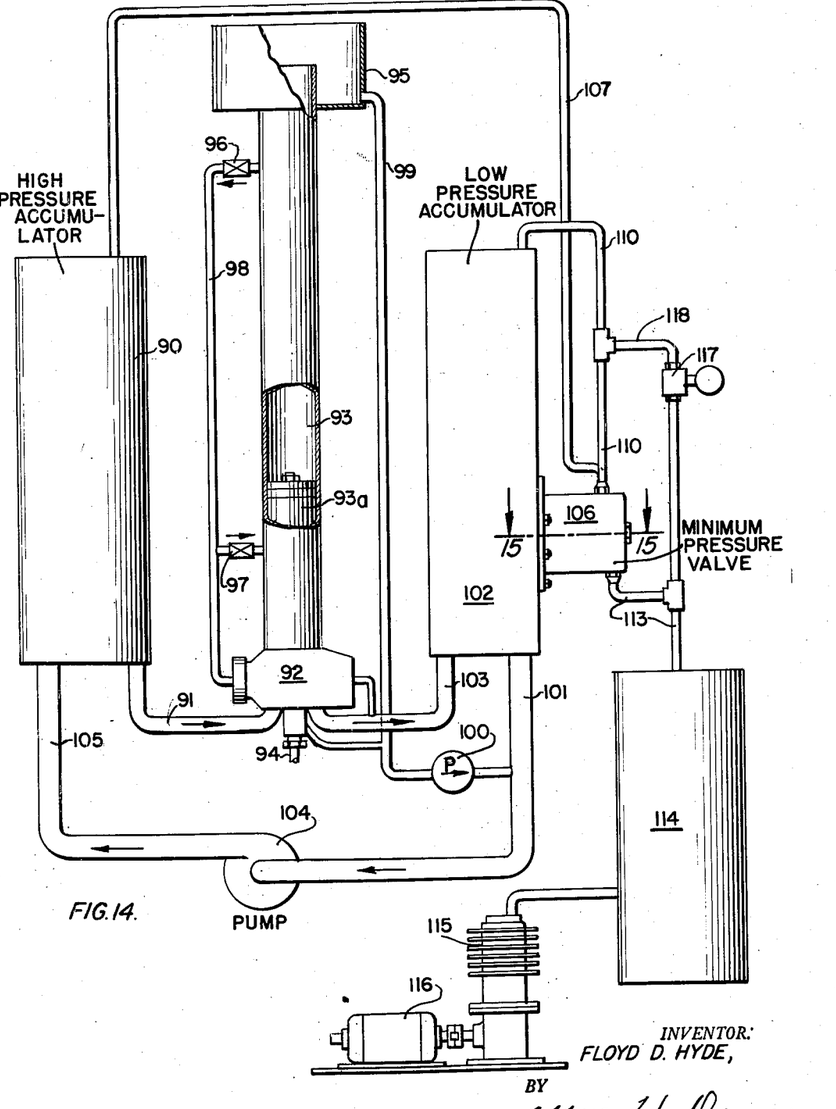
Fig. 14 is another further modified form of the working head for plunger pumps in accordance with the present invention.

In the modification of the invention as shown in Fig. 14 a high pressure accumulator 90 is provided with an outlet conduit 91 communicating with the inlet of the alternating valve 92 which is similar to the hereinbefore described alternating valve 50 shown in Fig. 7 of the drawing. Communicating with the alternating valve 92 is a working cylinder 93 having a piston 93a therein connected to a sucker rod 94. The piston 93a in the cylinder 93 is similar to the piston 47 shown in Fig. 7 of the drawings. A surge chamber 95 communicates with the upper end of the cylinder 93 and check valves 96 and 97 communicating with the tube 98 are arranged in connection with the cylinder 93 in a similar manner to the check valves 49 and 52 in communication with the tube 70 as shown in Fig. 7 of the drawings. The surge chamber 95 is provided with a drain tube 99 which communicates with a small pump 100 which delivers fluid to a conduit 101 at the outlet of a low pressure chamber 102. The alternating valve 92 is provided with a conduit 103 which is adapted to provide for exhaust of fluid from the cylinder 93 into the low pressure accumulator 102. The conduit 101 is arranged in communication with the inlet of a centrifugal or equivalent volume flow pump 104 which is provided with an outlet conduit 105 communicating with the interior of the high pressure accumulator 90. The centifugal pump 104 is arranged to transfer a large volume of fluid from the low pressure accumulator 102 to the high pressure accumulator 90 and such an arrangement is contemplated when the cylinder 93 is very long and quite large in diameter. In such a system the pump 104 being a centrifugal pump would be capable of delivering a greater volume of fluid than would pumps of a gear or vane type. When employing such a centrifugal pump 104 all of the fluid passages and the valve 92 would necessarily be of sufficient size to properly accommodate great volume flow therethrough. Communicating with the low pressure accumulator 102 is a valve casing 106. This valve casing is shown in detail in Figs. 15, 16, and 17 and is a housing for controls employed to add compressible fluid to the hydraulic fluid in the system when a minimum pressure and fluid level exists in the low pressure accumulator 102. Communicating with the casing 106 is a tube 107 which communicates with the upper interior of the high pressure accumulator 90. This tube 107 communicates with the interior of the casing 106 and a poppet valve 108 shown in Fig. 15. The poppet valve 108 is similar to another poppet valve 109 shown in Fig. 16 of the drawings which communicates with another tube 110 arranged in communicative relation with the upper interior of the low pressure accumulator 102. The tube 110 communicates with a passage 111 in the interior of the casing 106 and the passage 111 communicates with the poppet valve 109 which when open communicates with a passage 112 vented to atmosphere. Since the valve 108 is similar in construction to the valve 109 and is provided with passages 111 and 112 communicating therewith internally of the casing 106, the operation of the valve 108 is similar to the valve 109. A tube 113 communicates with the valve 108 whereby the valve 108 when opened interconnects tubes 107 and 113. The tube 113 communicates with a compressed air reservoir 114 which is charged by a compressor 115 operated by any suitable motor 116. Communicating with the tube 113 is a pressure regulator 117 which communicates by means of a tube 118 with the tube 110. The poppet valves 108 and 109 are reciprocally mounted in the casing 106 and their respective end portions 108a and 109a are engageable by the bar 119 which is pivotally connected with a clevis 120 by means of a pin 121. The clevis 120 is pivotally connected to a float arm 122 by means of a pin 123. The float arm 122 is pivoted to the casing 106 by means of a pin 124. On the end of the float arm 122 is a float 125 which floats on hydraulic fluid in the low pressure accumulator 102. The casing 106 is provided with a cavity 126 having a pressure responsive bellows 127 fixed therein by means of a fastening nut 128. Secured to the pressure responsive bellows 127 at the lower end thereof is a valve actuator limiter 129 shown best in Fig. 18 of the drawings. The valve actuator limiter 129 is provided with vertical guide portions 130 and 131 which are slidably supported in guides 132 and 133, respectively, which are fixed internally of the cavity 126 of the casing 106. The valve actuator limiter is provided with a downwardly directed ledge 134 adjacent the guide portion 130 and an upwardly directed ledge 135 adjacent the guide 131 all as shown best in Fig. 18 of the drawings. The ledge 134 is provided with a bar engaging edge 136 while the ledge 135 is provided with a bar engaging edge 137. These edges 136 and 137 are arranged to limit movement of the bar 119 and corresponding actuation of the valves 109 and 108, respectively. The positioning of these ledge portions 134 and 135 is accomplished by the bellows 127 which are responsive to pressure. When reduced pressure exists in the low pressure accumulator 102, the bellows 127 extend the valve actuator limiter 129 downwardly and when pressure increases in the low pressure accumulator 102, the bellows 127 collapse and carry the valve actuator limiter 129 upwardly. It will be seen that the ledge 135 passes the bar 119 when high pressure exists in the low pressure accumulator 102, while the existence of low pressure in the accumulator 102 cause the ledge 134 to pass the bar 119 and limit actuation of the valve 109, when the float 125 drops from its broken line position to the solid line position shown in Fig. 16 of the drawings.

Figure 15:
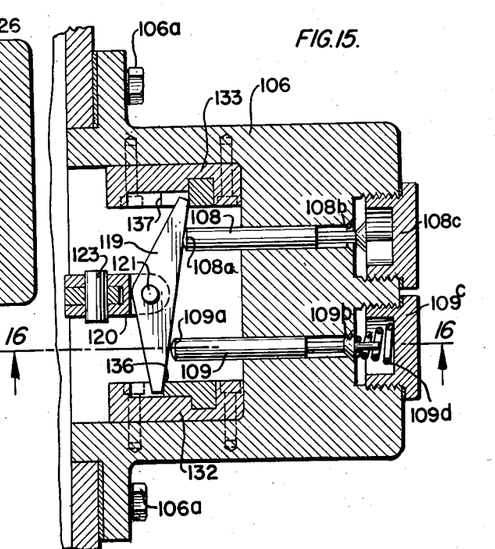
Fig. 15 is an enlarged fragmentary sectional view taken from the line 15—15 of Fig. 14.
Figures 16, 18:
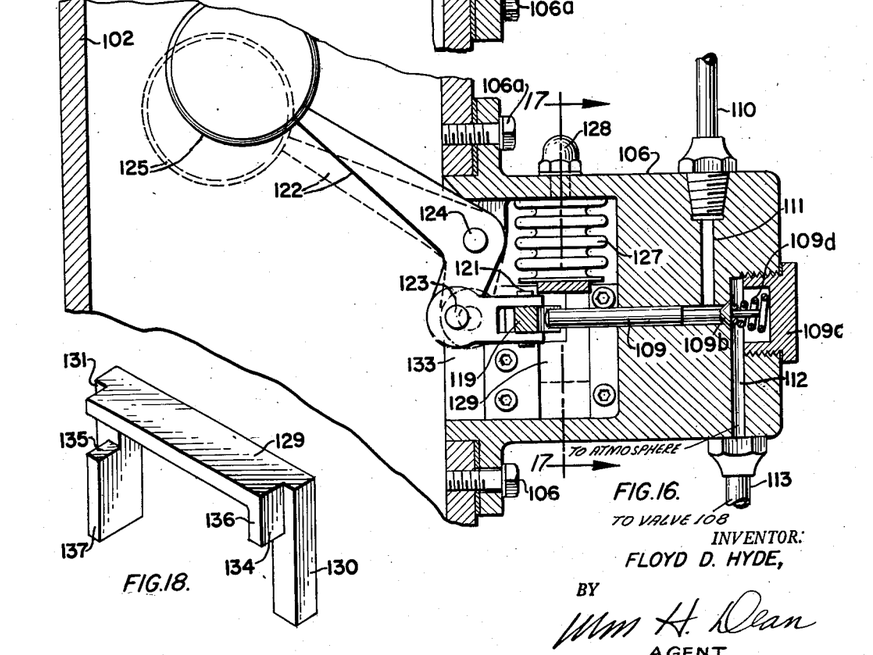
Fig. 16 is a fragmentary sectional view taken from line 16—16 of Fig. 15.
Fig. 18 is an isometric view of the valve actuator limiter of the structure shown in Figs. 15, 16, and 17. Similar characters of reference refer to similar parts and portions throughout the several views of the drawings.

The valve 109 is provided with a spring 109d which has sufficient compressive force to maintain the valve 109 closed against its seat 109b in opposition to pressure within the low pressure accumulator 102. The valve 108 is provided with a seat 108b and pressure communicating therewith through the tube 113 being greater than pressure in the low pressure accumulator 102 tends to hold the poppet valve closed on its seat 108b. The valves 108 and 109 are enclosed by casing caps 108c and 109c, respectively. These casing caps are screw threaded in the casing 106 and are fluid tight caps. The casing 106 is secured in fluid tight relationship to the low pressure accumulator 102 by means of bolts 106a.

The operation of the modification as shown in Figs. 14 to 18, inclusive, of the drawings is substantially as follows: The compressor 15 is operated by the motor 116 automatically to maintain a certain charge of compressed air in the tank 114 and pressure of the charge in the tank 114 is always substantially greater than the pneumatic pressure required in the high pressure accumulator 90. The small gear pump 100 is constantly operated to scavenge oil from the seal surrounding the sucker rod 94 and from the surge chamber 95 as hereinbefore described. The centrifugal pump 104 operates continuously to transfer hydraulic fluid from the low pressure accumulator 102 into the high pressure accumulator 90. The alternating valve 92 is operated to alternately transfer hydraulic fluid from the high pressure accumulator 90 into the cylinder 93 and outwardly thereof into the low pressure accumulator 102 as the piston 93a in the cylinder 93 reciprocates upwardly and downwardly therein. When the operation of the transfer pump 104 has been initiated it withdraws hydraulic fluid from the low pressure accumulator and deposits the same in the high pressure accumulator 90. While the pump 104 transfers fluid from the low pressure accumulator to the high pressure accumulator, compressed air passes through the tube 113 into the pressure regulator 117 which reduces the pressure to a predetermined minimum for the purpose of charging the low pressure accumulator 102. The predetermined minimum pressure as provided by the pressure regulator 117 therefore acts internally of the low pressure accumulator 102 and on the bellows 127. Such minimum pressure is insufficient to compress the bellows 127 and therefore the ledge 135 of the valve actuator limiter 129 is below the bar 119 and when the liquid level drops in the low pressure accumulator a sufficient distance to permit the float 125 to assume the dotted line position as shown in Fig. 16 of the drawings it pivots about the axis of the pin 124 causing the clevis 120 to force the actuating bar 119 toward the valves 108 and 109. One end of the actuator bar 119 engages the edge 136 of the ledge 134 while the opposite end of the bar 119 passes above the ledge 135 and opens the valve 108. This permits compressed air to pass from the tank 114 through the tube 113 and valve 108 to the tube 107 and into the upper interior of the high pressure accumulator 90. When sufficient pressure exists in the high pressure accumulator 90, fluid flows through the tube 91 to the alternating valve 92 and into the cylinder 93 whereupon the piston in the cylinder 93 raises the sucker rod 94 to its uppermost location whereupon the check valve 96 causes fluid in the tube 98 to actuate the alternating valve 92 permitting fluid to flow outwardly therethrough and into the tube 103 which exhausts the fluid into the low pressure accumulator 102. During downstroke of the piston in the cylinder 93, forced by gravity on the sucker rod 94, pressure in the low pressure accumulator is caused to rise above the predetermined minimum set by the regulator 117 and such a pressure rise causes compression of the bellows 127 bringing the ledge 135 to a position above the bar 119. If pressure in the low pressure accumulator 102 again drops down to the predetermined minimum during another stroke cycle of the piston in the cylinder 93, the bellows 127 again extends the valve actuator limiter 129 downwardly to the position shown in Fig. 6 of the drawings and when the float 125 drops to the solid line position air is again added, through the valve 108, to the high pressure accumulator 90. With repeated strokes of the piston in the cylinder 93 a balance of pressure will be reached between the high pressure accumulator 90 and the low pressure accumulator 102 whereupon the bellows 127 will be collapsed sufficiently to maintain the ledge 135 above the bar 119 to prevent opening of the valve 108 and to limit the addition of compressed air to the high pressure accumulator 90. As hereinbefore described, the valve 108 tends to close due to its exposure to high pressure air in the tube 113. Thus, it will be understood that additional compressed air may be added to the high pressure accumulator 90 only when a minimum pressure exists in the low pressure accumulator 102 and when a minimum fluid level also exists in the low pressure accumulator 102. In the event pressure in the low pressure accumulator 102 becomes excessive the bellows 127 will be collapsed causing the valve actuator limiter 129 to move upwardly to a position wherein the ledge 135 is above the bar 119. In the event such high pressure exists in the low pressure accumulator 102, when the liquid level is low enough to lower the float 125 to the dotted line position, it forces the actuator bar 119 into engagement with valve 109, below the ledge 134 of the valve actuator limiter 129 and causes the opening of the valve 109 against compression of the spring 109d. When the valve 109 is thus opened, air from the low pressure accumulator is exhausted through the tube 110 to the atmospheric vent 112 in the valve casing 106. When this air is exhausted to atmosphere it is at a higher pressure than that delivered from the regulator 117 due to compression in the cylinder 93 by weight of the rod 94 as it drops. It will be understood that excessive pressure in the low pressure accumulator 102, when a low liquid level exists therein, causes an exhaust of surplus pressure from the lower pressure accumulator through the valve 109 to atmosphere.

It will be noted that the volumetric capacity or displacement of the low pressure accumulator is proportioned so that exhaust of fluid from the working cylinder actually causes sufficient compression in the low pressure accumulator to provide a pneumatic cushion therein which substantially stops the downward movement of the working piston and sucker rod near the lowermost stroke position thereof. When employing a given working cylinder for wells of various depths, the weight of the plunger and sucker rod varies in proportion to the length of the rod. Additional length and corresponding weight of the sucker rod tend to cause greater compression of pneumatic fluid in the low pressure accumulator. In order to match the low pressure accumulator capacity to the sucker rod load, said capacity is reduced in proportion to an increase in sucker rod weight. The means for reducing the capacity of the low pressure accumulator is not shown in detail in the drawings of the application, however various mechanical arrangements may be made for matching the volumetric capacity of the low pressure accumulator to the sucker rod and corresponding well depth.

According to structural requirements of a durable and reliable hydro-pneumatic system the present embodiments of the invention employ working pressures of 150 to 200 pounds per square inch. In the system shown in Figs. 1 to 7, inclusive, of the drawings the minimum pressure in the low pressure accumulator is atmospheric pressure. Such a low minimum pressure provides for downstroke cushioning of the piston and sucker rod in wells down to about 800 feet. This proportional arrangement of sucker rod weight and volumetric capacity of the working cylinder relative to the low pressure accumulator does not impose an unduly great compression ratio of fluid in the low pressure accumulator. In this manner, excessive heating of the hydraulic fluid in the low pressure accumulator is avoided.

In order to avoid a high compression ratio in the low pressure accumulators of the deep well systems, according to the present invention, a pressure regulator maintains cushion pressure above atmospheric pressure in the low pressure accumulator. Such cushion pressure above atmospheric pressure readily stops the downstroke of a long heavy sucker rod without creating a ratio of compression sufficient to cause undue heating of the hydraulic fluid in the low pressure accumulator. It will be understood that the deep well systems, according to the present invention, which employ the pressure regulators between the low pressure accumulator and the transfer pump are adapted to operate in wells extending considerably below 800 feet and down to 15,000 to 20,000 feet. Such arrangements may be useful in deep oil wells or the like.

Figure 17:
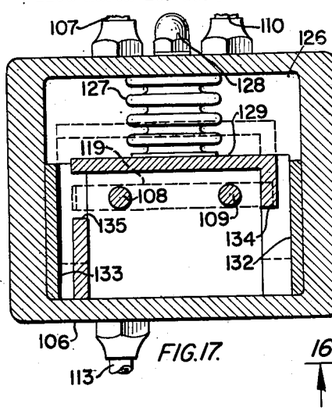
Fig. 17 is a sectional view taken from the line 17—17 of Fig. 16

The structure of the modification as shown in Figs. 14 to 18 of the drawings, inclusive, operates in a similar manner to that disclosed in the other forms of the invention hereinbefore described. The similarity exists in the operational arrangement wherein compressed air is added to the high pressure accumulator when a certain minimum pressure and liquid level exists in the low pressure accumulator. Compressible fluid is added to the system in response to the minimum condition in the low pressure accumulator. This mode of operation is generic to all of the previously described structures as disclosed herein, however it will be noted that since the arrangement shown in Figs. 14 to 18, inclusive, is for extremely large transfer of fluid from the low pressure accumulator to the high pressure accumulator and since a centrifugal transfer pump 104 is employed, actual transfer and compression of air by said pump is not feasible and therefore, the valve system as shown in Figs. 16 to 18, inclusive, adds compressible fluid directly to the high pressure accumulator 90 in response to a minimum pressure and liquid level condition in the low pressure accumulator 102.

Having thus described the invention and several specific embodiments thereof it is desired to emphasize the fact that further modification may be resorted to in a matter limited only by a just interpretation of the following claims.

Having thus described my invention what I claim as new and desire to secure by Letters Patent is:

1. A cylinder, a piston reciprocally mounted in said cylinder, a high pressure accumulator, a low pressure accumulator, a pump interconnecting said high pressure accumulator and said low pressure accumulator to deliver hydraulic fluid from said low pressure accumulator to said high pressure accumulator, compressible fluid in the upper portions of each of said accumulators, and a valve interconnecting said cylinder with said high and low pressure accumulators to alternately deliver high pressure fluid from said high pressure accumulator to said cylinder, and from said cylinder to said low pressure accumulator, means communicating with the inlet side of said pump for admitting air thereto when pressure therein drops below atmospheric, a pressure regulator intercommunicating with said low pressure accumulator and said pump to maintain pressure in said low pressure accumulator above atmospheric pressure when fluid pressure at the inlet of said pump is below atmospheric pressure, said pressure regulator having a pressure regulator valve interconnecting said low pressure accumulator and said pump to control flow of fluid from said low pressure accumulator to said pump, a movable means connected with said valve and having opposed first and second surfaces, second means for applying regulated pressure to said first surface and to the interior of said low pressure accumulator and a check valve intercommunicating with said low pressure accumulator and said first surface to prevent pressure existing in said cylinder from passing out of said low pressure accumulator to said first surface, said second surface communicating directly with pressure in said low pressure accumulator, said first surface having greater area exposed to regulated pressure than the area of said second surface exposed to pressure in the low pressure accumulator, whereby pressure in said low pressure accumulator is increased when the piston in said cylinder falls, causing the increased pressure to act on said second surface and to open said valve in opposition to said regulated pressure acting on said first surface, said pressure regulator valve when open permitting fluid to pass from said low pressure accumulator to said pump.

2. A cylinder, a piston reciprocally mounted in said cylinder, a high pressure accumulator, a low pressure accumulator, a pump interconnecting said high pressure accumulator and said low pressure accumulator to deliver hydraulic fluid from said low pressure accumulator to said high pressure accumulator, compressible fluid in the upper portions of each of said accumulators, and a valve interconnecting said cylinder with said high and low pressure accumulators to alternately deliver high pressure fluid from said high pressure accumulator to said cylinder, and from said cylinder to said low pressure accumulator, means communicating with the inlet side of said pump for admitting air thereto when pressure therein drops below atmospheric, a pressure regulator intercommunicating with said low pressure accumulator and said pump to maintain pressure in said low pressure accumulator above atmospheric pressure when fluid pressure at the inlet of said pump is below atmospheric pressure, said pressure regulator having a pressure regulator valve interconnecting said low pressure accumulator and said pump to control flow of fluid from said low pressure accumulator to said pump, a movable means connected with said valve and having opposed first and second surfaces, second means for applying regulated pressure to said first surface and to the interior of said low pressure accumulator and a check valve intercommunicating with said low pressure accumulator and said first surface to prevent pressure existing in said cylinder from passing out of said low pressure accumulator to said first surface, said second surface communicating directly with pressure in said low pressure accumulator, said first surface having greater area exposed to regulated pressure than the area of said second surface exposed to pressure in the low pressure accumulator, whereby pressure in said low pressure accumulator is increased when the piston in said cylinder falls, causing the increased pressure to act on said second surface and to open said valve in opposition to said regulated pressure acting on said first surface, said pressure regulator valve when open permitting fluid to pass from said low pressure accumulator to said pump, said second means comprising a conduit and a second pressure regulator means communicating with said high pressure accumulator.

3. A cylinder, a piston reciprocally mounted in said cylinder, a high pressure accumulator, a low pressure accumulator, a pump interconnecting said high pressure accumulator and low pressure accumulator to deliver hydraulic fluid from said low pressure accumulator to said high pressure accumulator, compressible fluid in the upper portions of each of said accumulators, and a valve interconnecting said cylinder with said high and low pressure accumulators to alternately deliver high pressure fluid from said high pressure accumulator to said cylinder, and from said cylinder to said low pressure accumulator, means comprising a pressure tank, a compressor for forcing air thereinto, a pressure regulator intercommunicating with said tank and said low pressure accumulator for maintaining a minimum pressure in said low pressure accumulator, a control in said low pressure accumulator having liquid level and pressure responsive elements, said pressure responsive element adapted to be actuated by pressure in said low pressure accumulator when greater than said minimum pressure, said liquid level responsive element operated by liquid at a minimum level in said low pressure accumulator, tank outlet valve means operatively associated with said liquid level and pressure responsive elements and intercommunicating with said high pressure accumulator and said tank, whereby minimum liquid level and pressure conditions in said low pressure accumulator cause said pressure responsive element to cooperate with said liquid level responsive element to open said tank outlet valve for adding compressed air to said high pressure accumulator, a low pressure accumulator vent valve operable by said liquid level and pressure responsive elements, said vent valve intercommunicating with said low pressure accumulator and atmosphere, whereby, a minimum liquid level accompanied by pressure greater than said minimum in said low pressure accumulator causes cooperation of said liquid level and pressure responsive elements to open said vent valve and relieve pressure from said low pressure accumulator to atmosphere.

4. A cylinder, a piston reciprocally mounted in said cylinder, a high pressure accumulator, a low pressure accumulator, a pump interconnecting said high pressure accumulator and said low pressure accumulator to deliver hydraulic fluid from said low pressure accumulator to said high pressure accumulator, compressible fluid in the upper portions of each of said accumulators, and a valve interconnecting said cylinder with said high and low pressure accumulators to alternately deliver high pressure fluid from said high pressure accumulator to said cylinder, and from said cylinder to said low pressure accumulator, means communicating with the inlet side of said pump for admitting air thereto when pressure therein drops below atmospheric and a pressure regulator intercommunicating with said low pressure accumulator and said pump to maintain pressure in said low pressure accumulator above atmospheric pressure when fluid pressure at the inlet of said pump is below atmospheric pressure, said pressure regulator having a valve member, a diaphragm connected therewith and communicating with said low pressure accumulator and an adjustable spring for forcing said valve member into closed position tending to shut off flow of fluid from said low pressure accumulator to said pump, said spring adapted to resist pressure up to a predetermined minimum, whereby pressure in said low pressure accumulator above said minimum acts on said diaphragm and opens said pressure regulator valve member, thereby permitting flow of fluid from said low pressure regulator to said pump.

5. A cylinder, a piston reciprocally mounted in said cylinder, a high pressure accumulator, a low pressure accumulator, a pump interconnecting said high pressure accumulator and said low pressure accumulator to deliver hydraulic fluid from said low pressure accumulator to said high pressure accumulator, compressible fluid in the upper portions of each of said accumulators, and a valve interconnecting said cylinder with said high and low pressure accumulators to alternately deliver high pressure fluid from said high pressure accumulator to said cylinder, and from said cylinder to said low pressure accumulator, means communicating with the inlet side of said pump for admitting air thereto when pressure therein drops below atmospheric and an unloading valve interconnecting said high pressure accumulator and said value having means responsive to fluid flow from said high pressure accumulator to said cylinder and disposed to vent pressure from said high pressure accumulator when flow to said cylinder increases to an excessive rate.

6. A cylinder, a piston reciprocally mounted in said cylinder, a high pressure accumulator, a low pressure accumulator, a pump intercommunicating with said high pressure accumulator and said low pressure accumulator to deliver hydraulic fluid to said high pressure accumulator, compressible fluid in the upper portions of each of said accumulators, and a valve operable by said piston alternately to deliver high pressure fluid from said high pressure accumulator to said cylinder and from said cylinder to said low pressure accumulator, a check valve communicating with the inlet side of said pump for admitting air thereto when pressure therein drops below atmospheric, and a pressure regulator intercommunicating with said low pressure accumulator and said pump to maintain pressure in said low pressure accumulator above atmospheric pressure when fluid pressure at the inlet of said pump is below atmospheric pressure.

7. A cylinder, a piston reciprocally mounted in said cylinder, a sucker rod supported by said piston, a high pressure accumulator, a low pressure accumulator, a pump interconnecting with said high pressure accumulator and said low pressure accumulator to deliver hydraulic fluid to said high pressure accumulator, compressible fluid in the upper portions of each of said accumulators, a valve interconnecting said cylinder with said high and low pressure accumulators to alternately deliver high pressure fluid from said high pressure accumulator to said cylinder and from said cylinder to said low pressure accumulator, means communicating with the inlet of said pump and the outside atmosphere for admitting air to the inlet of said pump when the pressure therein drops below atmospheric and a port means communicating with the upper interior of said cylinder and said valve, means for conducting hydraulic fluid pressure to said valve when said piston passes said port, said valve having opposed surfaces responsive to fluid pressure, one of said surfaces communicating with said port, and means intercommunicating with said other surface of said valve and said low pressure accumulator.

8. In a hydro-pneumatic working head for plunger pumps the combination of: a cylinder; a piston reciprocally mounted in said cylinder; a first accumulator; a second accumulator; both of said accumulators containing hydraulic fluid and compressible fluid; a pump intercommunicating with said first and second accumulators and operable to transfer fluid from the interior of said second accumulator to the interior of said first accumulator; valve means intercommunicating with both of said accumulators and said cylinder, said valve operable by said piston alternately when near each end of the piston stroke whereby said valve alternately transfers fluid from said first accumulator to said cylinder and from said cylinder to said second accumulator; a gravity responsive load carrying rod operatively connected with said piston and tending to force said piston axially of said cylinder to exhaust fluid from said cylinder and into said second accumulator; the volumetric displacement of said cylinder being proportional to the volumetric displacement of said second accumulator, whereby fluids exhausted into said second accumulator from said cylinder by said piston cause compression of fluid in said second accumulator to resist the response of said load carrying rod to gravity; and a check valve communicating with the inlet of said pump for automatically admitting compressible fluid thereinto when pressure at said inlet drops below a predetermined pressure due to the transfer of fluids by said pump from said second accumulator to said first accumulator; said check valve disposed to prevent escape of said fluid therethrough when said piston exhausts fluid from said cylinder and thereby compresses fluid in said low pressure accumulator, said pump being the only means for forcefully adding compressible fluid to fluid in said first accumulator for increasing pressure therein preliminary to and during operation of said hydropneumatic working head.

9. In a hydro-pneumatic working head for plunger pumps the combination of: a cylinder; a piston reciprocally mounted in said cylinder; a first accumulator; a second accumulator; both of said accumulators containing hydraulic fluid and air; a pump intercommunicating with said first and second accumulators and operable to transfer fluid from the interior of said second accumulator to the interior of said first accumulator; valve means intercommunicating with both of said accumulators and said cylinder, said valve operable by said piston alternately when near each end of the piston stroke whereby said valve alternately transfers fluid from said first accumulator to said cylinder and from said cylinder to said second accumulator; a gravity responsive load carrying rod operatively connected with said piston and tending to force said piston axially of said cylinder to exhaust fluid from said cylinder and into said second accumulator; the volumetric displacement of said cylinder being proportional to the volumetric displacement of said second accumulator, whereby fluids exhausted into said second accumulator from said cylinder by said piston cause compression of fluid in said second accumulator to resist the response of said load carrying rod to gravity; a check valve intercommunicating with atmosphere and the inlet of said pump for automatically admitting air into the inlet of said pump when pressure at said inlet drops below atmospheric pressure due to the transfer of fluids by said pump from said second accumulator to said first accumulator; said check valve disposed to prevent escape of said fluid therethrough to atmosphere when said piston exhausts fluid from said cylinder and thereby compresses fluid in said low pressure accumulator, said pump being the only means for forcefully adding air to said first accumulator for increasing pressure therein preliminary to and during operation of said hydro-pneumatic working head; and a hydraulic surge chamber communicating with atmosphere and the upper end of said cylinder above said piston, said surge chamber communicating with the inlet of said check valve.

10. In a hydro-penumatic working head for plunger pumps the combination of: a cylinder; a piston reciprocally mounted in said cylinder; a first accumulator; a second accumulator; both of said accumulators containing hydraulic fluid and air; a pump intercommunicating with said first and second accumulators and operable to transfer fluid from the interior of said second accumulator to the interior of said first accumulator; valve means intercommunicating with both of said accumulators and said cylinder, said valve operable by said piston alternately when near each end of the piston stroke whereby said valve alternately transfers fluid from said first accumulator to said cylinder and from said cylinder to said second accumulator; a gravity responsive load carrying rod operatively connected with said piston and tending to force said piston axially of said cylinder to exhaust fluid from said cylinder and into said second accumulator; the volumetric displacement of said cylinder being proportional to the volumetric displacement of said second accumulator, whereby fluids exhausted into said second accumulator from said cylinder by said piston cause compression of fluid in said second accumulator to resist the response of said load carrying rod to gravity; a check valve intercommunicating with atmosphere and the inlet of said pump for automatically admitting air into the inlet of said pump when pressure at said inlet drops below atmospheric pressure due to the transfer of fluid by said pump from said second accumulator to said first accumulator; said check valve disposed to prevent escape of said fluid therethrough to atmosphere when said piston exhausts fluid from said cylinder and thereby compresses fluid in said low pressure accumulator, said pump being the only means for forcefully adding air to fluid in said first accumulator for increasing pressure therein preliminary to and during operation of said hydro-pneumatic working head; and a pressure regulator intercommunicating with said second accumulator and said pump to maintain pressure in said second accumulator above atmospheric pressure when fluid pressure in the inlet of said pump is below atmospheric pressure.

References Cited in the file of this patent

UNITED STATES PATENTS

| | | |
|---|---|---|
| 732,908 | Thomson | July 7, 1903 |
| 1,032,040 | Atwood | July 9, 1912 |
| 1,427,241 | Sunderman | Aug. 29, 1922 |
| 2,141,703 | Bays | Dec. 27, 1938 |
| 2,185,448 | Suter | Jan. 2, 1940 |
| 2,251,290 | Reed | Aug. 5, 1941 |
| 2,279,057 | Reed | Apr. 7, 1942 |
| 2,617,256 | White | Nov. 11, 1952 |